US009350976B2

(12) United States Patent
Busse

(10) Patent No.: US 9,350,976 B2
(45) Date of Patent: May 24, 2016

(54) IMAGING UNIT OF A CAMERA FOR RECORDING THE SURROUNDINGS WITH OPTICS UNCOUPLED FROM A CIRCUIT BOARD

(71) Applicant: SILICON MICRO SENSORS GMBH, Dresden (DE)

(72) Inventor: Erik Busse, Altenburg (DE)

(73) Assignee: FIRST SENSOR MOBILITY GMBH, Dresden (DE)

( * ) Notice: Subject to any disclaimer, the term of this patent is extended or adjusted under 35 U.S.C. 154(b) by 346 days.

(21) Appl. No.: 13/798,288

(22) Filed: Mar. 13, 2013

(65) Prior Publication Data

US 2013/0194388 A1 Aug. 1, 2013

Related U.S. Application Data

(63) Continuation-in-part of application No. 12/324,011, filed on Nov. 26, 2008, now Pat. No. 8,488,045.

(30) Foreign Application Priority Data

Nov. 26, 2007 (DE) .......................... 10 2007 057 172
Nov. 26, 2008 (EP) ...................................... 13157445

(51) Int. Cl.
*H04N 13/02* (2006.01)
*H04N 5/225* (2006.01)

(52) U.S. Cl.
CPC ............. *H04N 13/02* (2013.01); *H04N 5/2253* (2013.01); *H04N 13/0239* (2013.01); *H04N 5/2251* (2013.01); *H04N 5/2257* (2013.01)

(58) Field of Classification Search
CPC ... H04N 13/02; H04N 5/2251; H04N 5/2252; H04N 5/2253; H04N 5/2254; H04N 5/2257; H04N 5/2258; H04N 5/225
USPC .......................................................... 348/46
See application file for complete search history.

(56) References Cited

U.S. PATENT DOCUMENTS

| 4,942,539 | A | 7/1990 | McGee et al. |
| 5,701,154 | A | 12/1997 | Dasso |
| 5,749,827 | A | 5/1998 | Minami |
| 5,783,815 | A * | 7/1998 | Ikeda .......................... 250/208.1 |

(Continued)

FOREIGN PATENT DOCUMENTS

| DE | 10259795 A1 | 7/2004 |
| DE | 102004010957 A1 | 9/2005 |

(Continued)

OTHER PUBLICATIONS

European Search Report for EP 13157445.1 dated Apr. 10, 2013.

*Primary Examiner* — Jay Patel
*Assistant Examiner* — Francis G Geroleo
(74) *Attorney, Agent, or Firm* — Heslin Rothenberg Farley & Mesiti P.C.

(57) ABSTRACT

An imaging unit of a camera for recording the surroundings has an image sensor with a lens for the display of the surroundings on the image sensor. The image sensor and the lens are held by a carrier. The camera additionally has a circuit board and at least the signal and the supply lines of the image sensor arranged an the carrier. The image sensor is mounted an a carrier substrate, which similar to the lens, is arranged on the carrier at a distance from the circuit board, and has a flexible electrical connection to the circuit board.

10 Claims, 1 Drawing Sheet

(56) References Cited

U.S. PATENT DOCUMENTS

| | | | |
|---|---|---|---|
| 5,821,532 A * | 10/1998 | Beaman et al. | 250/239 |
| 6,156,587 A | 12/2000 | Kayanuma et al. | |
| 6,392,688 B1 | 5/2002 | Barman et al. | |
| 6,476,417 B2 | 11/2002 | Honda et al. | |
| 6,727,564 B2 | 4/2004 | Shinomiya | |
| 6,762,796 B1 | 7/2004 | Nakajoh et al. | |
| 7,074,638 B2 | 7/2006 | Maeda et al. | |
| 7,242,433 B2 | 7/2007 | Tanaka et al. | |
| 7,333,147 B2 | 2/2008 | Adachi et al. | |
| 7,391,457 B2 | 6/2008 | Fujimoto et al. | |
| 7,570,297 B2 | 8/2009 | Maeda et al. | |
| 7,609,461 B1 * | 10/2009 | Webster et al. | 359/811 |
| 8,064,146 B2 * | 11/2011 | Iwasaki | 359/703 |
| 2001/0050721 A1 | 12/2001 | Miyake | |
| 2001/0055073 A1 | 12/2001 | Shinomiya | |
| 2002/0167605 A1 | 11/2002 | Akimoto et al. | |
| 2003/0025825 A1 | 2/2003 | Nakajoh | |
| 2003/0057359 A1 * | 3/2003 | Webster | 250/216 |
| 2003/0164891 A1 | 9/2003 | Akimoto | |
| 2003/0234886 A1 * | 12/2003 | Cho | H04N 5/2253 348/340 |
| 2004/0070667 A1 | 4/2004 | Ando | |
| 2004/0223072 A1 | 11/2004 | Maeda et al. | |
| 2005/0036056 A1 | 2/2005 | Ikemachi et al. | |
| 2005/0041195 A1 | 2/2005 | Bone | |
| 2005/0179805 A1 * | 8/2005 | Avron et al. | 348/340 |
| 2005/0205956 A1 | 9/2005 | Oda | |
| 2005/0242274 A1 * | 11/2005 | Webster | 250/239 |
| 2006/0091290 A1 * | 5/2006 | Yoshihara | H01L 27/14618 250/208.1 |
| 2006/0215021 A1 | 9/2006 | Suto et al. | |
| 2007/0183764 A1 * | 8/2007 | Imura et al. | 396/55 |
| 2007/0196103 A1 * | 8/2007 | Cheng et al. | 396/529 |
| 2007/0223913 A1 * | 9/2007 | Lee | 396/529 |
| 2008/0093560 A1 * | 4/2008 | Puhakka et al. | 250/370.08 |
| 2008/0100934 A1 * | 5/2008 | Webster et al. | 359/830 |
| 2008/0285968 A1 * | 11/2008 | Chang et al. | 396/542 |
| 2009/0002532 A1 | 1/2009 | Nishida et al. | |
| 2009/0127644 A1 * | 5/2009 | Van Arendonk et al. | 257/432 |
| 2009/0135247 A1 | 5/2009 | Busse | |

FOREIGN PATENT DOCUMENTS

| | | |
|---|---|---|
| EP | 1 607 782 A2 | 12/2005 |
| JP | 2006091177 A | 4/2006 |

* cited by examiner

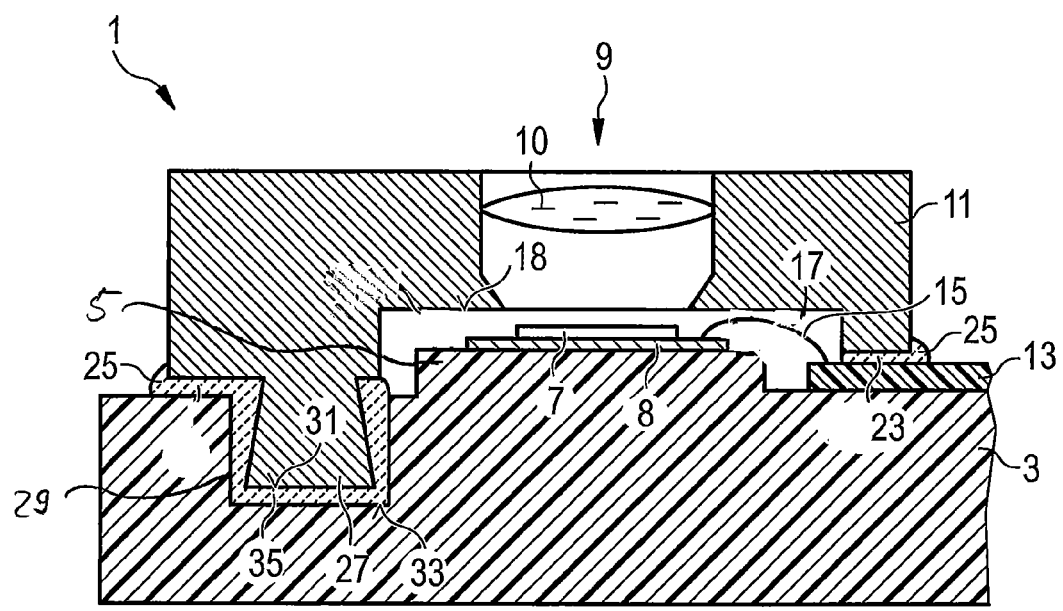

IMAGING UNIT OF A CAMERA FOR RECORDING THE SURROUNDINGS WITH OPTICS UNCOUPLED FROM A CIRCUIT BOARD

CROSS REFERENCE TO RELATED APPLICATIONS

This application is a Continuation-in-Part of U.S. application Ser. No. 12/324,011, filed Nov. 26, 2008, and claims priority of German Application No.: 10 2007 057 172.2, filed on Nov. 26, 2007, and European application No. 13157445.1 filed on Mar. 1, 2013.

BACKGROUND ART

The invention relates to an imaging unit of a camera for recording the surroundings using an image sensor, to which one lens is allocated to display the surroundings on the image sensor, whereby the image sensor is held by a carrier, and with a circuit board arranged on said carrier and which has at least the signal and the supply lines of the image sensor.

Such imaging units are used for various applications, e.g. for stereoscopic cameras, in order to control the movement of a mobile device based on the optically recording and processing of the surroundings. In order to realize possible functions of the device, its positioning, as well as avoiding any collisions when in motion, it is necessary to constantly detect objects of the surroundings and their distance from the device, and to supply it for real-time processing.

The design of such an imaging unit of a camera regularly comprises an electronic image sensor, to which a lens is allocated, which is adjusted to the respective application and also the sensor. The image sensor is mounted on a circuit board, on which signal lines, supply lines, and if applicable at least preliminary signal processing units are arranged.

The circuit board including the described structures is mounted on a carrier. The lens is arranged above the image sensor at a distance that is necessary according to the optical system of the lens. It is mounted onto the carrier and the circuit board in such a way, so that the image sensor is entirely encased, and light only impinges on the image sensors through the lenses. If necessary, the lens has a separate housing for this purpose.

The carrier and also its connections to the circuit board and the lens or its housing must meet various mechanical, thermal, chemical, and electrical requirements for the different applications, whereby the mechanical stability is to be ensured especially for the use in mobile devices. For this reason, the carriers are usually made of metal.

Furthermore, the thermal expansion behavior of the carrier and that of the circuit board mounted permanently onto the carrier affects the images taken by the camera. The different expansion coefficients of the two materials connected to each other lead to a shifting of the image sensors relative to their lenses because of the heat created by the electronic components when operating. Therefore, a loss of image quality is detected, e.g. during extended operating, in particular for a stereoscopic camera. In this way, the interferences are caused by diffused light, which impinges on an image sensor through defective connections between the carrier and the lens. The connections between the carrier and the lens are mostly adhesive connections, which can tear away from the carrier and the lens due to thermal expansions.

BRIEF SUMMARY OF THE INVENTION

Therefore, one aspect of the invention is to present an imaging unit of a camera, which ensures temporarily stable optics of the imaging unit even when undergoing thermal and mechanical stress.

Through the imaging unit as described in the following, any influence on its optical axis of the imaging unit in particular through the circuit board or through the connection of the circuit board to the carrier is prevented when undergoing mechanical or thermal stress. Both the lens and the image sensor have a mechanical connection to the carrier only.

By uncoupling the optics from the circuit board, the position and the angle of the optical axis can be adjusted timewise in a very stable manner. A drift of the optical axis of less than one pixel was detected, and that for both a mechanical shock impact of up to the 150-fold gravitational acceleration as well as operating temperatures ranging from −20° C. to 70° C. Such values could be obtained with a carrier having a thinner material than known carriers, so that particularly for high-valued materials expenditure could be minimized.

Furthermore based on the arrangement of the image sensor on a carrier substrate and because of a flexible contacting between the circuit board and the carrier substrate, the known electronic image sensor and lenses can be used. Thus depending on the design of the lens, image sensors can be used with and without a housing, whereby the encased image sensors make the assembly of the camera outside a clean room environment possible.

The assembly of the lens onto the carrier also meets the camera's enhanced capacity to resist mechanical and thermal stress by arranging the lens above the image sensor using a lens fastener and in this way creates an optically sealed hollow space around the image sensor, not including the optical path of the lens. This allows a mounting of the lens across a more extensive area supporting the compensation of mechanical tension between the carrier and the lens fastener while maintaining a joint between the two components to be connected, and using a flexible joint material to create the connection. In this way, any tearing of the connection can be prevented over a wide range of thermal and mechanical stress.

Furthermore, the creation of a hollow space around the image sensor also allows the use of unencased components, as long as the performance requirements of the image sensor demand such. Of course within the hollow space, encased components can be used just as well.

Further through creating a hollow space around the image sensor and thus, around the carrier substrate, it is possible to protect the flexible electrical connection between the image sensor and the circuits of the circuit board from any damage by arranging the flexible connection inside the hollow space. For this purpose, the lens fastener can have a penetration through which the conductor line extends into the hollow space. In order to realize a comparable connection at this location, there is also such a joint between the lens fastener and the circuit board, as between the lens fastener and the carrier. This joint connected with the circuit board is closed in the same manner as the other one with the carrier. For example, silicone also has the necessary adhesive properties, as well as the required flexibility over a wide range of temperatures and the chemical resistance.

BRIEF DESCRIPTION OF THE DRAWING FIGURES

In the following, the invention is to be described in greater detail using an exemplary embodiment. The respective drawing FIG shows one imaging unit of a camera in a cross section.

DETAILED DESCRIPTION

The camera comprises a plate-shaped carrier 3 with a rectangular base, which in the present exemplary embodiment is made from stainless steel. Carrier 3 has a pedestal 5, on which, on a flat carrier substrate 8 not shown in any more detail, an electronic image sensor 47 is supported. Each pedestal 5 has a support area slightly larger than the carrier substrate 8.

A lens 9 is arranged using a lens fastener 11 above the image sensor 1 and at a distance therefrom. One image sensor 7 and one lens 9 each form a single imaging unit 1. An optical system shall be referred to as lens 9, comprising various optical elements, such as lenses or mirrors or others, and displaying an object on the image sensor 7. The focus of the lens 9 can be adjusted in a fixed manner in various embodiments, known as a fix-focus system, or is adjustable in the installed condition, so that only following the installation of the lens 9 the focused projection of objects of certain distances is adjusted according to the then existing distance between the lens 9 and the image sensor 7.

A circuit board 13 is arranged on the carrier 3 adjacent to the pedestal 5 and at a distance thereto, which has an electronic circuit (not shown in greater detail) with integrated circuits, active and passive switch elements, and the necessary conductive pathways as well as conductors for conducting signals to and from the image sensors 7 (not shown in greater detail) and for supplying power to the image sensors 7. The electronic circuit comprises, for example, the control of the imaging unit, for the recording of the images amongst other functions, the power supply for the image sensors 7, or a unit for a preliminary processing of the signals received by the image sensors 7, in which the signals are processed for forwarding to a processing unit. For the signal transmission between these components of the circuit board 13 and the image sensor 7, and for supplying power to the image sensor 7, carrier substrate 8 of an image sensor 7 is electrically connected to the circuit board 13 via flexible connectors 15. As electrical connections 15 of components, different embodiments are known through the semi-conductor technology also suitable for this application such as, e.g. the connection using wire bridges. The image sensor 7 is electrically contacted by the carrier substrate 8 (not shown in greater detail).

The lens fastener 11 of the imaging unit holds, protects, and positions a lens 9, i.e. an optical system for the display the objects surrounding the mobile device, and has the shape of a cuboid. The optical system therefore comprises several different optical elements according to the requirements for the imaging; however, for clarity purposes only one lens is shown. Standard embodiments of lenses 9 can also be used for the stereoscopic camera described.

The lens fastener 11 has a recess 17 at its side facing the carrier 3, whose base 18 is larger than the pedestal 5, on which the image sensor 7 arranged on a carrier substrate 8 is supported. The lens fastener 11 is arranged on the carrier 3 in such a way, so that the recess 17 arches over the pedestal 5 and the image sensor 7 with a defined distance between the base 18 of the recess 17 and the image sensor 7.

The depth of the recess 17 is realized in such a way, so that the lens fastener 11 ends circumferentially with a joint above the carrier 3, without any further direct mechanical contact thereto. The lens fastener 11 also is in a similar joint with the circuit board 13, which extends through a low penetration 23 in the lens fastener 11 into the hollow space formed by the recess 17 around the pedestal 5. The joint of the lens fastener 11 with the carrier 3 as well as the circuit board 13 is closed circumferentially with a flexible joint material 25, so that based on the optically dense materials of the lens fastener 11 and the joint material 25, the hollow space is realized in an optically sealed manner, with the only possible radiation incidence through the lens 9 positioned above the image sensor 7. The use of a flexible joint material 25 makes the compensation of thermally caused stress between the usually different materials of the carrier 3 and the lens fastener 11 possible. The optical density does not only relate to visible light but can be related to all ranges of wavelengths that can be used for the recording of the surroundings in the respective application.

In the exemplary embodiment shown, the joint material 25 simultaneously fulfills the function of attaching the lens fastener 11 to the carrier 3 by having adhesive properties. Alternatively, special means of attachment may also be arranged at the lens fastener 11 and the carrier 3.

The fixation of the precise lateral position of the lens fastener 11 relative to the image sensor 7, and also its angular alignment is realized by providing fastening means 27 at the lens fastener 11, each of which extends into a recess 29 in the carrier 3. Through the amount, position, and design of the fastening means 27 and recesses 29, it is possible to define an unambiguous allocation of a certain lens fastener 11 relative to the imaging unit and to its exact position, so that its assembly is also possible in at least a partially automated fashion.

One function of the fastening means 27 is the fixation of the lens fastener 11 in its position even under mechanical stress, as said position cannot be ensured for above described adhesion through the adhesive connection of lens fastener 11 and carrier 3 by means of a flexible material. For this purpose, the height of the fastening means 27 and the depth of the recess 29 are chosen with such a size that a distance remains between the two bases 31, 33 of the fastening means 27 and the recess 29 positioned opposite each other. Equally, the cross sections of fastening means 27 and the recess 29 are always of such a size, so that in this case again an intermediate space remains around the fastening means 27 relative to the lateral wall of the recess 29.

The distance and intermediate space around the fastening means 27 is filled with a curable mass, which is cured in the assembled state of the imaging unit shown. During the curing process, during which the fastening means 27 is immersed in the mass, the mass leads to a tensile stress on the fastening means 27 into the recess 29 as a consequence of the shrinking process associated with the curing, the below described form of the fastening means 27 and as a consequence of the materials also below the fastening means 27.

In order to realize an engagement area at the fastening means 27 for the forces acting during the shrinking process and acting in the recess 29, the fastening means 27 is shaped in such a way, so that its cross section, i.e. its virtual cross section positioned parallel to the base 31 of the fastening means 27, increases towards the base 31. The shape of the fastening means 27 can be realized, e.g. by a regular conical design. However, other embodiments are also possible, e.g. an irregular tilted or one-sided cone as shown in FIG. 1, or a stepwise increase due a ledge, as long as the curable mass entirely encloses the fastening means 27 using the mass during the immersion of the fastening means 27 or during the subsequent filling of the intermediate space in the recess 29, and it has an engagement area at the fastening means 27 through a tensile force acting downward through the shrinking of the mass.

The invention claimed is:

1. An imaging unit of a camera for recording of surroundings, comprising: an image sensor, a lens to display the surroundings on the image sensor, a carrier, a separate carrier substrate for mounting the image sensor upon a first exterior surface of the carrier, and a circuit board arranged on the first exterior surface of the carrier laterally spaced apart from the separate carrier substrate, the circuit board having at least signaling and supply lines for the image sensor, wherein the image sensor is electrically contacted by the separate carrier substrate, and the separate carrier substrate is electrically connected to the signaling and supply lines using flexible electrical connections, resulting in flexible contacting between the circuit board and the separate carrier substrate, and further comprising a lens fastener of optically dense material forming a hollow space around the image sensor together with the carrier, the lens fastener being mounted on the carrier in an optically sealed manner, and wherein the lens fastener has a penetration, through which the circuit board extends into the hollow space, so that there is a joint between the lens fastener and the circuit board, and the joint is closed with a flexible and optically dense joint material.

2. The imaging unit of a camera according to claim 1, wherein the lens fastener is arranged above the first exterior surface of the carrier circumferentially with a joint, and the joint is closed with a flexible and optically dense joint material.

3. The imaging unit of a camera according to claim 2, wherein the lens fastener is fixated on the carrier through adhesion using the joint material.

4. The imaging unit of a camera according to claim 2, wherein the joint material comprises silicone.

5. The imaging unit of a camera according to claim 1, wherein the lens fastener is fixated on the carrier through adhesion using the joint material.

6. The imaging unit of a camera according to claim 1, wherein the joint material comprises silicone.

7. The imaging unit of a camera according to claim 1, wherein focus of the lens is adjustable.

8. The imaging unit of a camera according to claim 1, wherein the image sensor is encased.

9. The imaging unit of a camera according to claim 1 wherein the carrier comprises metal.

10. An imaging unit of a camera for recording of surroundings, comprising: an image sensor, a lens to display the surroundings on the image sensor, a carrier, a separate carrier substrate for mounting the image sensor upon a first exterior surface of the carrier, and a circuit board arranged on the first exterior surface of the carrier laterally spaced apart from the separate carrier substrate, the circuit board having at least signaling and supply lines for the image sensor, wherein the image sensor is electrically contacted by the separate carrier substrate, and the separate carrier substrate is electrically connected to the signaling and supply lines using flexible electrical connections, resulting in flexible contacting between the circuit board and the separate carrier substrate, and further comprising a lens fastener of optically dense material forming a hollow space around the image sensor together with the carrier, the lens fastener being mounted on the carrier in an optically sealed manner, wherein the lens fastener has a fastening means extending into a recess in the first exterior surface of the carrier, and a cross sectional area of the fastening means positioned parallel to a base of the recess increases towards the base, the fastening means extends into the recess to an extent that there is an intermediate space between a base of the fastening means and the base of the recess, and a space of the recess surrounding the fastening means including said intermediate space is filled with a curable material.

\* \* \* \* \*